(12) United States Patent
Stoerzer

(10) Patent No.: US 7,473,375 B2
(45) Date of Patent: Jan. 6, 2009

(54) METHOD AND DEVICE FOR REMOVAL OF RESIDUAL PRODUCTS

(75) Inventor: Robert Gerard Stoerzer, Matthews, NC (US)

(73) Assignee: Rosenmund VTA AG, Liestal (CH)

( * ) Notice: Subject to any disclaimer, the term of this patent is extended or adjusted under 35 U.S.C. 154(b) by 0 days.

(21) Appl. No.: 11/579,007

(22) PCT Filed: May 11, 2005

(86) PCT No.: PCT/IB2005/051536

§ 371 (c)(1),
(2), (4) Date: Dec. 20, 2007

(87) PCT Pub. No.: WO2005/113107

PCT Pub. Date: Dec. 1, 2005

(65) Prior Publication Data

US 2008/0173594 A1    Jul. 24, 2008

(30) Foreign Application Priority Data

May 23, 2004    (CH)    .................................... 0888/04

(51) Int. Cl.
*B01D 25/32* (2006.01)
*B01D 25/38* (2006.01)
*B01D 29/075* (2006.01)

(52) U.S. Cl. ................. 210/791; 210/406; 210/407; 210/408; 210/413; 210/415

(58) Field of Classification Search ............... None
See application file for complete search history.

(56) References Cited

U.S. PATENT DOCUMENTS

| | | | | |
|---|---|---|---|---|
| 624,633 A | * | 5/1899 | Erdwardes | 210/171 |
| 903,697 A | * | 11/1908 | Frasch | 210/272 |
| 1,135,080 A | * | 4/1915 | Vandercook | 210/194 |
| 1,139,825 A | * | 5/1915 | Vandercook | 210/779 |
| 1,574,557 A | * | 2/1926 | Coe | 210/272 |
| 1,661,290 A | * | 3/1928 | Jewett | 210/172.2 |
| 1,686,017 A | * | 10/1928 | Lovett | 210/413 |

(Continued)

FOREIGN PATENT DOCUMENTS

CH    600 928 A5    6/1978

(Continued)

OTHER PUBLICATIONS

The Nutsche Pressure Filter; dowloaded from http://www.solidliquid-separation.com/pressurefilters/Nutsche/nutsche.htm on Aug. 14, 2008; 5 pages.*

Nutsche Filter—Data Sheet DS19-100-1; Pfaudler Reactor Systems; May 1999; 2 pages.*

*Primary Examiner*—Robert James Popovics
(74) *Attorney, Agent, or Firm*—Tarolli, Sundheim, Covell & Tummino LLP

(57) ABSTRACT

The residual material in a filter-dryer (1) is removed from the screen (15) by careful scraping with a lasso like belt (20). The scraped material will be removed through a side opening (16). To gain this remaining material adds to the yield of the process by reducing loss of product, and does not endanger personnel unnecessarily and therefore save process costs.

13 Claims, 5 Drawing Sheets

U.S. PATENT DOCUMENTS

| | | | | |
|---|---|---|---|---|
| 1,741,334 | A | * | 12/1929 | Pietzsch ..................... 210/239 |
| 1,864,757 | A | * | 6/1932 | Pietzsch ..................... 210/239 |
| 1,864,825 | A | * | 6/1932 | Jewett et al. ................ 210/239 |
| 1,865,061 | A | * | 6/1932 | Grob .......................... 210/769 |
| 1,957,303 | A | * | 5/1934 | Tietig ......................... 210/218 |
| 2,014,945 | A | * | 9/1935 | Mayer ...................... 435/291.6 |
| 2,089,702 | A | * | 8/1937 | Lomax ....................... 210/408 |
| 2,102,385 | A | * | 12/1937 | Schock ......................... 241/94 |
| 2,404,215 | A | * | 7/1946 | Cavanaugh ................. 210/772 |
| 2,834,474 | A | * | 5/1958 | Jalkanen .................... 210/408 |
| 2,901,763 | A | * | 9/1959 | Jalkanen .................... 15/246.5 |
| 2,909,286 | A | | 10/1959 | Norell |
| 3,412,863 | A | * | 11/1968 | Stuart, Sr. ................... 210/793 |
| 3,441,141 | A | * | 4/1969 | Eicher et al. ................ 210/241 |
| 3,608,721 | A | * | 9/1971 | Lopker ....................... 210/772 |
| 3,743,539 | A | * | 7/1973 | Kroyer et al. ................. 127/16 |
| 3,836,464 | A | * | 9/1974 | Brokins et al. .............. 210/413 |
| 3,980,560 | A | * | 9/1976 | Eades .......................... 210/141 |
| 4,017,399 | A | * | 4/1977 | Lopker ....................... 210/408 |
| 4,081,381 | A | * | 3/1978 | Rosenmund et al. ........ 210/408 |
| 4,376,705 | A | * | 3/1983 | Komura et al. .............. 210/413 |
| 4,399,042 | A | * | 8/1983 | Stannard et al. ............. 210/791 |
| 4,417,980 | A | * | 11/1983 | Baur et al. .................... 210/91 |
| 4,592,835 | A | * | 6/1986 | Grieder et al. .............. 210/107 |
| 4,657,636 | A | * | 4/1987 | Satomi ....................... 162/261 |
| 4,828,697 | A | * | 5/1989 | Kuhnt et al. ................ 210/408 |
| 4,888,111 | A | * | 12/1989 | Diemer ....................... 210/178 |
| 4,975,183 | A | * | 12/1990 | Glorer ........................ 210/107 |
| 5,071,546 | A | * | 12/1991 | Ruegg ........................ 210/148 |
| 5,130,021 | A | * | 7/1992 | Pierson ....................... 210/399 |
| 5,139,667 | A | * | 8/1992 | Reneau, Jr. .................. 210/319 |
| 5,269,923 | A | * | 12/1993 | Diemer et al. .............. 210/413 |
| 5,356,541 | A | * | 10/1994 | Wickzell ..................... 210/791 |
| 5,544,424 | A | * | 8/1996 | Haleen ......................... 34/187 |
| 5,544,425 | A | * | 8/1996 | Haleen ......................... 34/187 |
| 5,564,350 | A | * | 10/1996 | Peplinski .................... 110/344 |
| 5,653,869 | A | * | 8/1997 | Evangelisti ................. 210/232 |
| 5,659,971 | A | * | 8/1997 | Haleen ......................... 34/166 |
| 5,746,007 | A | * | 5/1998 | Haleen ......................... 34/187 |
| 5,759,231 | A | * | 6/1998 | Bremer et al. ................ 75/379 |
| 6,890,129 | B2 | * | 5/2005 | Fabbri ......................... 406/106 |
| 6,959,504 | B2 | * | 11/2005 | Fabbri ........................... 34/380 |
| 2003/0000101 | A1 | * | 1/2003 | Fabbri ........................... 34/380 |
| 2003/0000103 | A1 | * | 1/2003 | Fabbri ........................... 34/576 |
| 2004/0050802 | A1 | * | 3/2004 | Banister et al. ............. 210/771 |
| 2008/0067137 | A1 | * | 3/2008 | Banister et al. ............. 210/771 |
| 2008/0173594 | A1 | * | 7/2008 | Stoerzer ...................... 210/791 |

FOREIGN PATENT DOCUMENTS

| | | | |
|---|---|---|---|
| DE | 4108707 | A1 * | 9/1992 |
| EP | 0 138 188 | A2 | 4/1985 |
| EP | 1 270 097 | A2 | 1/2003 |
| EP | 1270097 | A2 * | 1/2003 |
| EP | 1277506 | A1 * | 1/2003 |
| JP | 580 17 812 | A | 2/1983 |
| JP | 59109215 | A * | 6/1984 |
| JP | 62001416 | A * | 1/1987 |
| JP | 02187109 | A * | 7/1990 |
| JP | 03143511 | A * | 6/1991 |
| WO | WO 9006798 | A1 * | 6/1990 |

* cited by examiner

METHOD AND DEVICE FOR REMOVAL OF RESIDUAL PRODUCTS

BACKGROUND OF THE INVENTION

1. Field of the Invention

The invention relates to the removal of residual product from a vessel and more specifically to the removal of residual product from a filter-dryer unit with a side opening for emptying, employing a so called "lasso-technique".

2. Background of the Invention Art

Filter-Dryers are used in the production for filtration and drying at the first place. But also extractions, washing and other intermediate processes are processed in these apparatus. It often is the aim to process several steps in the same unit. If it is possible to proceed without discharging the product and thus without opening the containment, losses of valuable substances and danger for poisoning personnel or damaging the product can be minimized.

The variations of Materials to be treated that way go from simple chemical products which have to be dried to highly sensitive and even toxic products of the pharmaceutical Industry. Especially for the latter it is desirable not to expose the products to air and endanger personnel by handling it. To treat several production steps in one and the same unit therefore is highly desirable.

The basic material is typically fed to the filter-dryer unit as a slurry of a predefined mixture of crystals suspended in liquid. A batch of such a slurry is commonly loaded into the filter-dryer. This filter-dryer unit usually is in the form of a sealed, cylindrically shaped vessel having a filter in its base to allow the liquid to be drained from the vessel through the filter plate. A side or center discharge opening is provided to allow the resulting dry product, often a powder, to be removed from the vessel to a receiving container or the like. Usually a mechanical agitator rotates in the vessel at a relatively slow rate. This mechanical agitator will be moved up and down during its rotation in order to generate new surfaces on the slurry and powder especially during the drying process. With this agitator one avoids the generation of wet clumps as a most homogeneous mass is required in the slurry-phase as well as in the powder-phase. This mechanical agitator also serves to remove the dried or treated product mechanically out of the vessel discharge opening.

In this apparatus the liquid particles will be separated from the solids by a first step with a filtration process. The bottom plate of such a apparatus is a filter plate and a following drying process under special temperature and vacuum conditions. For this processes the target always is to produce crystals and solids as product with the highest possible yield, e.g. the lowest possible moisture contained.

Treating cosmetics, pharmaceutical and other valuable goods the problem faced is always that a residue of the finished product tends to remain in various parts of the vessel. U.S. Pat. No. 5,564,350 introduces a so called "gasknife" for the removal of these residues by means of pressed air or pressed inert gases. For many products this device works very good. It might give some problems if the fine fluffy powder does not create e.g. explosion danger or the wet powder does stick too hard to the filter plate on the bottom of the apparatus.

The main part and in many cases the last remaining volume of residual material, called the heel, is left on the bottom plate of the vessel and is not readily removable for discharge. This bottom plate of the vessel is provided with relatively fragile and expensive filter screens which allow the liquid to pass from the vessel while preventing the loss of solids by holding it back. The mechanical agitator is a relatively coarse device which may be on the order of up to 4 meters in diameter. To ensure that the filter-screens are not damaged by the agitator, a minimal clearance is required between the agitator and the screens. This clearance may be on the order of up to several millimeters for big filter-dryers. The residue in that space and elsewhere in the vessel is typically washed away at the end of the batch processing and is therefore a loss which reduces the yield of the production.

In the processing of pharmaceutical substances different batches may not be mixed together and therefore the residue is essentially lost if it has to be washed out. The lost residue often makes up to 15% of the batch. For expensive material such as highly concentrated pharmaceuticals substances this is great loss. Very often the heel will be scratched out by hand which might be dangerous for the personnel due to poisonous or toxic volatiles or substances.

Due to this fact the use of a filter-dryer for several process steps might not be applicable even if the process itself offers very advantageous possibilities for the product with such procedures.

BRIEF DESCRIPTION OF THE DRAWING

An embodiment of the invention is described below with reference to drawing in which.

DETAILED DESCRIPTION

It is to be understood that the proposed and presented arrangement is merely illustrative of the application of the principles of the invention and that other arrangements may be devised by those skilled in the art without departing from the spirit and scope of the invention.

Figure 1:
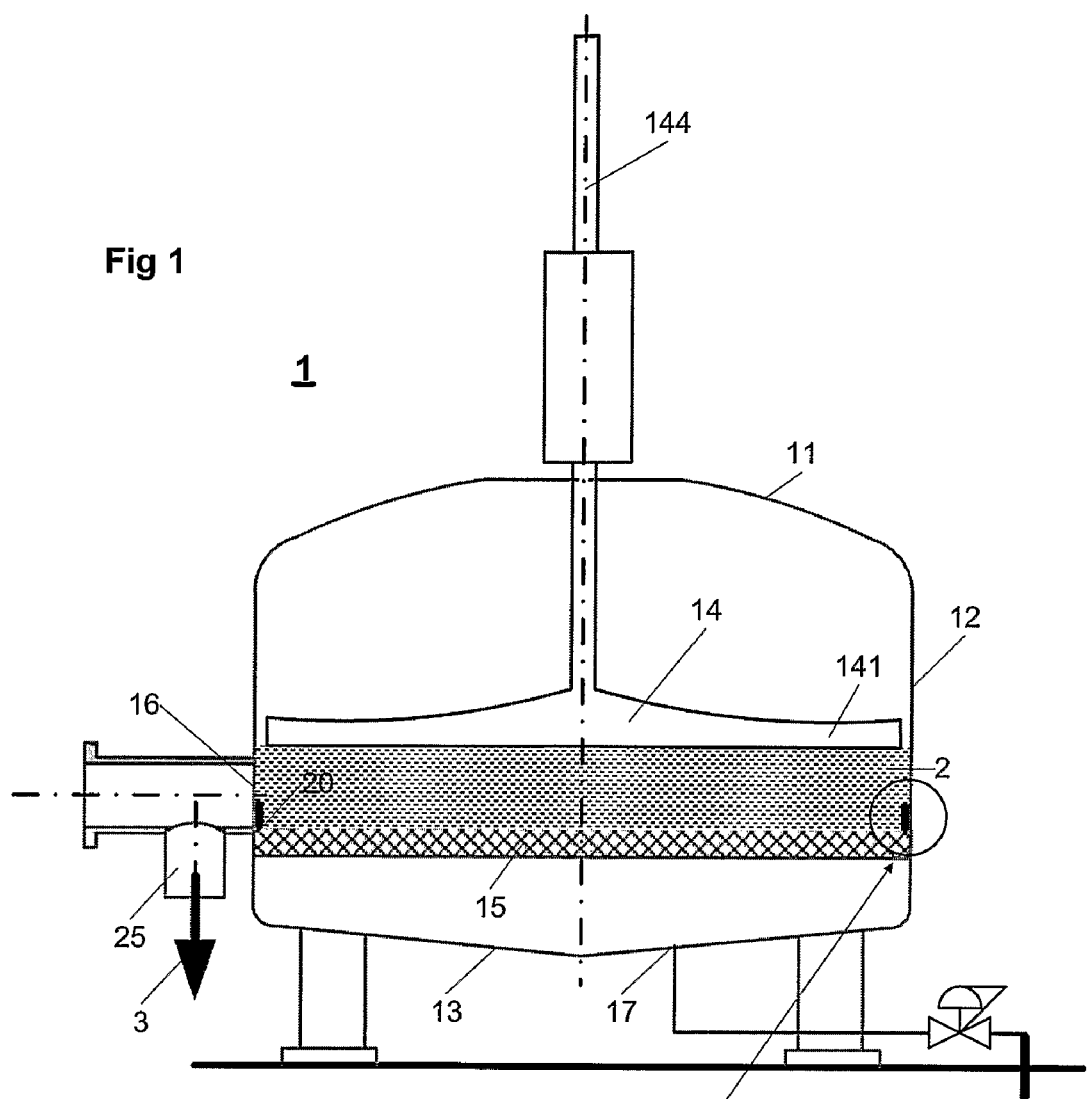
FIG. 1 shows a cross section of the filter-dryer

FIG. 1 is a cross sectional side view of the vessel 1 which most typically is used as a filter dryer. The vessel 1, preferably of cylindrical shape with a domed top 11, a vertical side wall 12 extending around the circumference of the cylindrical vessel 1 and a domed bottom 13. A separation plate 15 which will at least partly contains a filter plate which allows for the passage of liquid from the vessel while filtering out solid particles of the material to be recovered. These solid particles form during the filtration process a compact filter cake 2 on the separation plate 15. The liquid filtrate 4 is collected at the bottom 13 an drained over the discharge tube 17. A side discharge opening 16 is provided for the removal of the filter cake 2 in form of solid product 3 as powder or clumps. Another type of this kind of filter dryers called "Rosenmund-Filter" (see EP 0 138 188) provide additionally a discharge opening for the solid product in the center of the bottom but this variation of a filter-dryer need not be described and is not shown in the figures.

In order to increase efficiency of such an equipment a mechanical agitator 14 is provided turning around the shaft 144 in the center of the cylindrical vessel 1. Such rotating mechanical agitator 14 has one or more arms 141. This agitator 14 is used to press the filter cake 2 in order to accelerate the filtration process. After finishing the filtration process and especially during the drying process this agitator 14 very often is used to mix and shift the solid product 3 in order to loosen the compact filter cake 2 preferably to powder or at least clumps.

Figure 2:
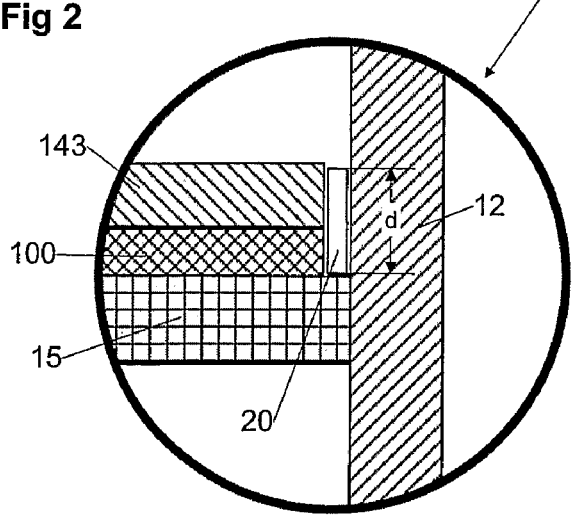
FIG. 2 shows a detail of the cross section of the filter-dryer.

Along the circumference of the vessel 1 on top of the filter plate 15 a belt 20 can be positioned either from the beginning or at the last step of the emptying process. This belt 20 called "lasso" has at least the length identical to the circumference of the inner diameter of the containment. It is of a thickness of 3-5 mm and a width of 50-100 mm and it's position is between the side wall 12, the tip of the agitator arm 141 and it is in contact with the separation plate 15 (FIG. 2). Its ends 201' and 201" reach through the side opening 16 outside the Vessel 1.

Figure 3:
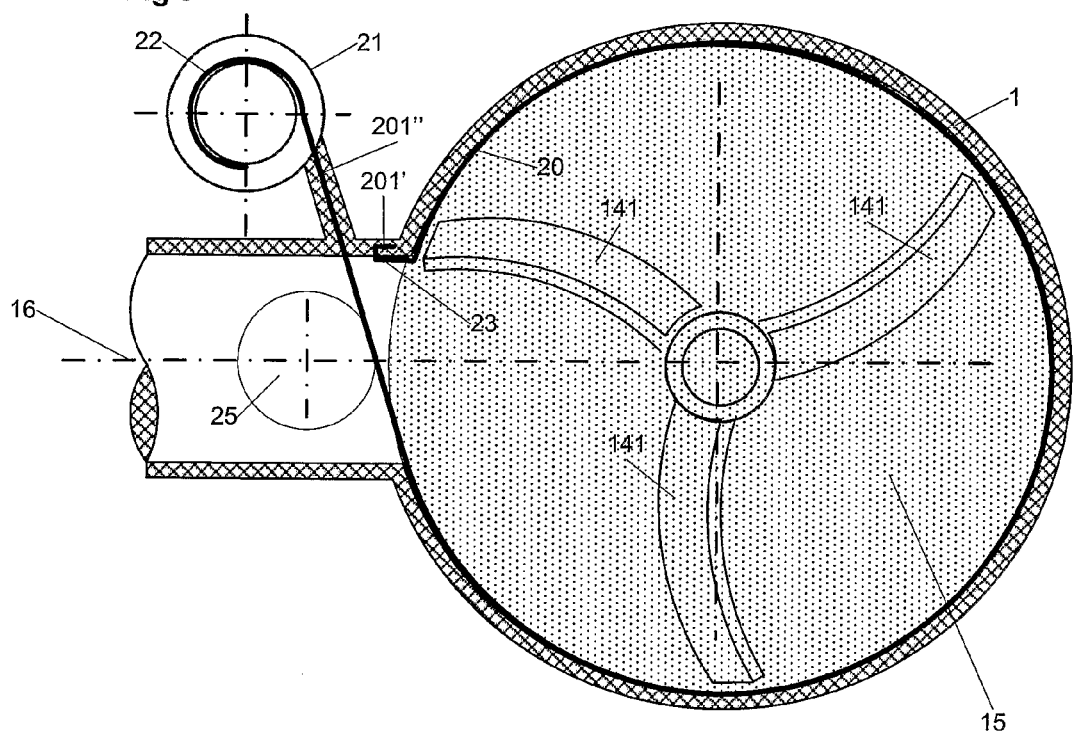
FIG. 3 shows a cross section view from the top on the filter plate.

One end 201' of the belt 20 usually will connected with one side of the side opening 16 e.g. at fixation 23 (FIG. 3), whereas the other end 201" will e.g. be connected to a special wind up device 22 with which this end 201" of the belt 20 can be pulled in to a box 21 outside the side opening 16 and the vessel 1 (FIG. 3).

Figure 4:
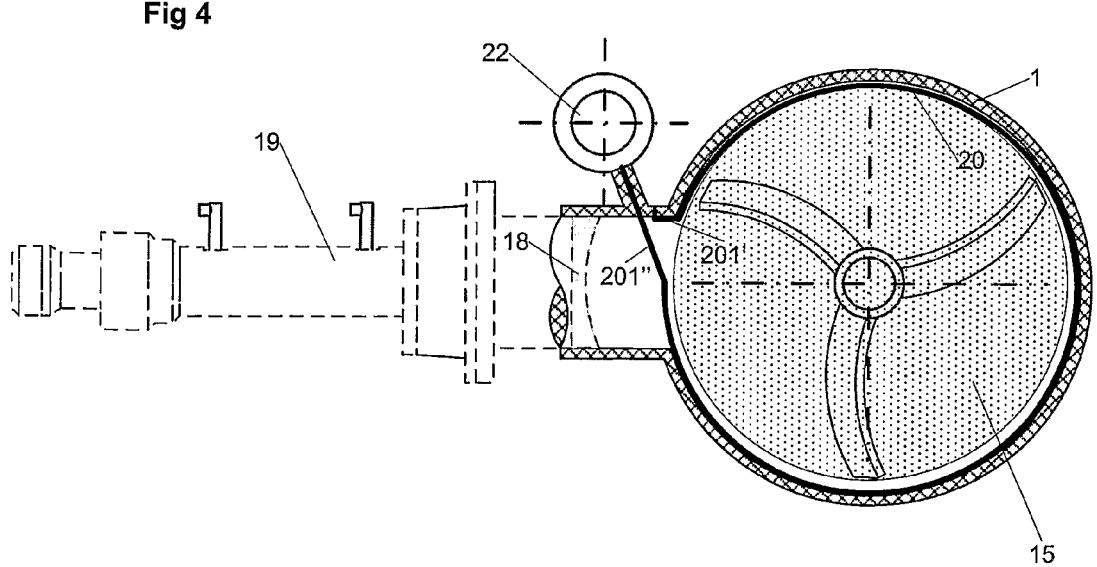
FIG. 4 shows an automatic side opening device.
Figure 5:
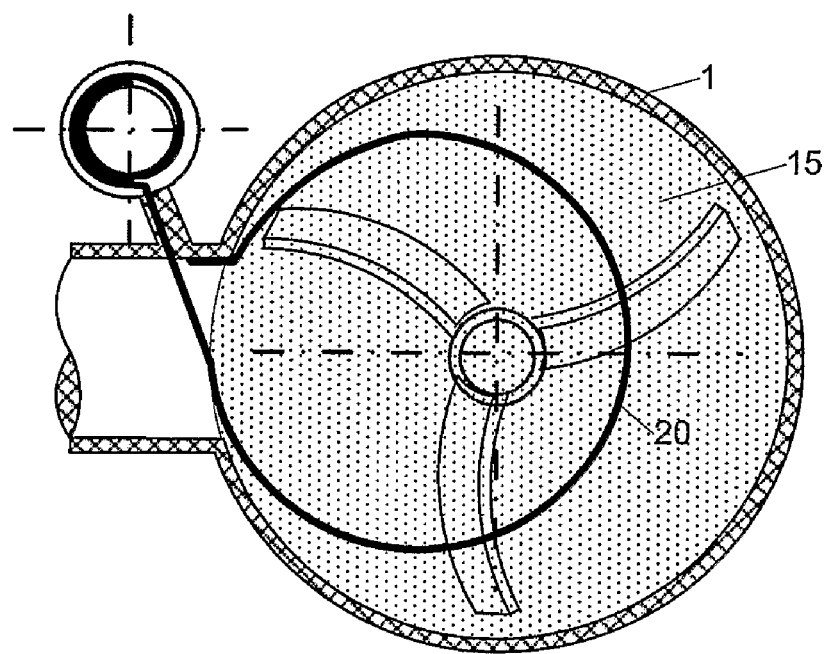
FIG. 5 shows a cross section view from the top on the filter plate.
Figure 6:
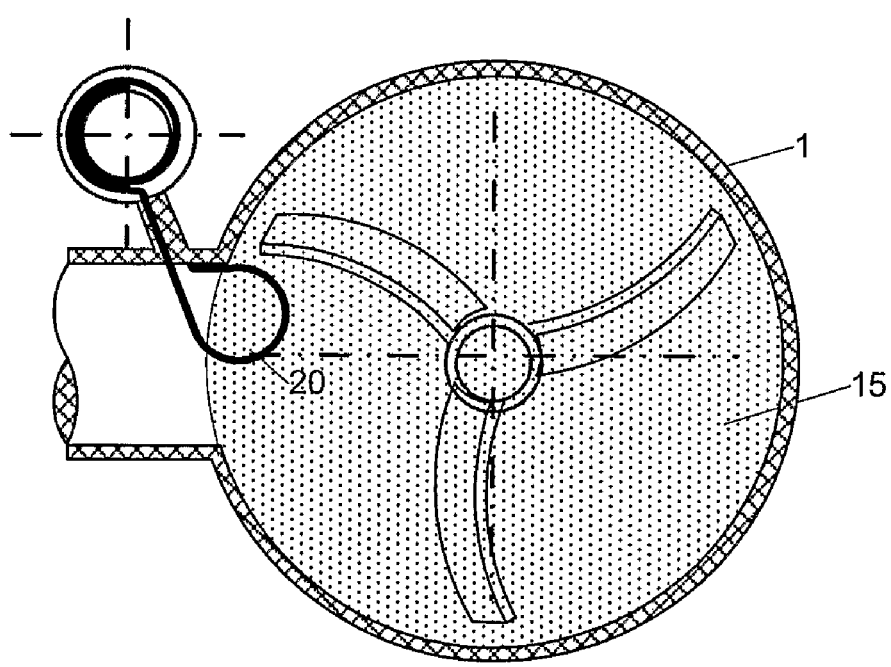
FIG. 6 shows a cross section view from the top on the filter plate.
Figure 7:
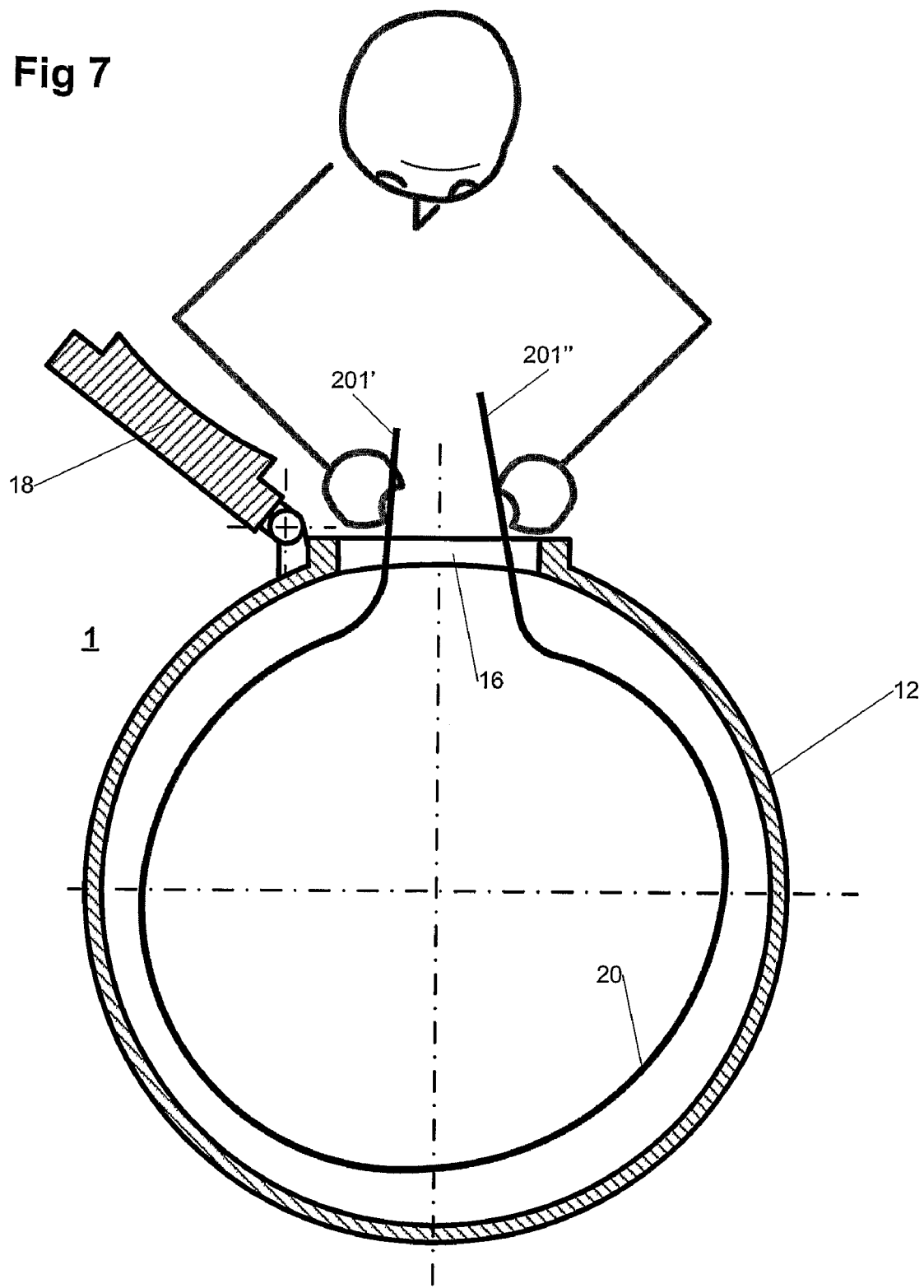
FIG. 7 shows a principal view of a hand operated device.

During the process the containment of vessel 1 naturally must be closed. In order to offer a smooth surface over the whole circumference of the side wall 12 the lid 18 will have the shape to continue the line of side wall 12 (FIG. 7). This lid 18 can be securely closed by a simple bolt system used for such apparatus or it can be equipped with a sophisticated hydraulically operated opening device 19 as shown in FIG. 4. For the method according to the inventive idea with the belt 20 this does not change in the effective cleaning and removing process of the heel 100. This process works as it is shown in FIG. 3 to FIG. 6. The loop of the belt 20 will be narrowed by pulling one or both ends 201', 201" outside the vessel 1 through the side opening 16. During this the rather stiff belt 20 will scratch the heel 100 from the surface of the separation plate 15 which works at least partly as the filtration plate. The heel 100 will be moved towards the side opening 16 and drops down through discharge opening 25 (FIG. 1 and FIG. 3) where it can be collected safely.

Figure 8:
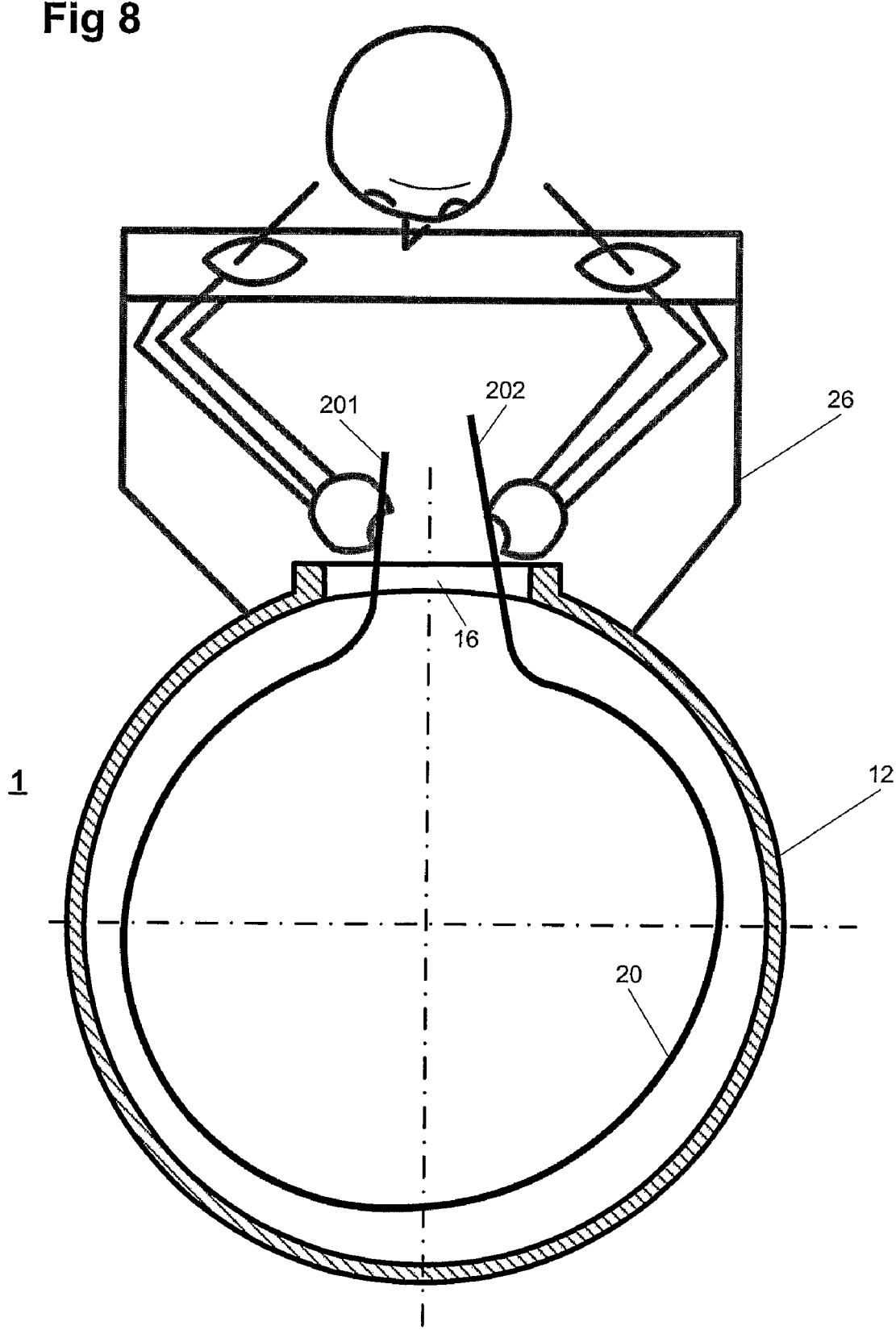
FIG. 8 shows a principal view of an hand operated device with a human protection cab for the operator.

The inventive idea is to use a belt 20 in order to remove all the rest of the solid particles 3 of the filter cake 2 from the separation plate 15. This invention will avoid expensive losses of valuable products in particular production of active pharmaceutical substances. There are two ways and methods for the application of this inventive device to remove the heel 100 providing a belt 20: An automatic or semi automatic method for which the equipment is shown in FIG. 2 to FIG. 4 and a manually operated way shown in FIG. 7 and FIG. 8. For the basic idea of this invention this does not make any difference. In case a mechanical device is used the human protection against toxic substances can be offered rather well. For the production of active pharmaceutical substances very often only very small equipment is used as the bulk of one production are small but these substances are very expensive. The manual process in these cases has the preference. In the manual process the operator must be protected from toxic substances. In such cases this inventive method can be executed in by using a human protection box 26 to safeguard the operator as shown in FIG. 8.

The invention claimed is:

1. Filter-dryer vessel (1) comprising:
   a sealed cylindrically shaped vessel (1) having a top cover (11), a bottom plate (13) and a side wall (12) joined to the top cover (11) and the bottom plate (13);
   a separation plate 15 at least partially formed by a filter element, positioned in the lower third of the vessel (1);
   a turning agitator (14) in the center of the vessel (1) comprising an agitator shaft (144) and at least one agitator arm (141), having no predetermined direction of rotation and being vertically movable;
   at least one side opening (16) on or above the separation plate (15) in the side wall (12);
   a belt (20) having at least the length of the circumference of the inner diameter of the cylindrical part of the containment with a thickness of 3-5 mm and a width "d" of 50-100 mm, is positioned between the side wall and the tip of the agitator arms (141) along the circumference of the container and the two ends (201) of said belt (20) being fixed outside the containment of the vessel (1) throughout the side opening (16).

2. Filter-dryer vessel according to claim 1 wherein at least one end (201') of belt (20) is connected to the side opening (16) at at point (23).

3. Filter-dryer vessel according to claim 1 wherein at least one end (201") is connected to a wind up device (22).

4. Filter-dryer vessel according to claim 3 wherein the wind up device (22) is operated manually.

5. Filter-dryer vessel according to claim 3 wherein the wind up device (22) is operated hydraulically.

6. Filter-dryer vessel according to claim 1 wherein the side opening (16) is equipped with a lid (18) having the shape to continue the line (curvature) of the side wall (12).

7. Filter-dryer vessel according to claim 1 wherein the lid (18) is equipped with a hydraulic opening device (19).

8. Filter-dryer vessel according to claim 1 wherein the tube elongation of the side opening (16) is equipped with a discharge opening (25) close to the side wall (12) in its lower part, and the lid (18) is movable from the side wall (12) over this discharge opening (25).

9. Filter-dryer vessel according to claim 1 wherein the whole area around the side opening (16) is hermetically closed by a human protection box (26).

10. Method for removing the heel (100) with the filter-dryer vessel (1) according to claim 1 whereas:
    during the filtration process the belt (20) is placed in the corner between the side wall (12) and the separation plate (15) along the circumference of the cylindrical vessel (1), whereas both ends (201) of the belt (20) are held in the side opening (16) of the side wall (12) during the process covered with a lid (18) which is formed in order to smoothly continue this cylindrical part of the side wall (12) when it is closed;
    upon the end of the filtration and drying process the agitator arms (141) remove the main part of the filter cake (2) outside by mechanical means, trough the side opening (16) and will then fall out through the opening (25) on the bottom of the tube in the elongation of the side opening (16);
    after the emptying process the remaining heel (100) on the separation plate (15) will be removed by pulling the belt (20) through the side opening (16), scratching the belt (20) along the separation plate (15), moving the heel (100) outside the vessel (1) through side opening (16) and opening (25).

11. Method according to claim 10, wherein the one end (201') of the belt (20) is held by a fixation (23) and the other end of the belt (20) is held by the wind up device (22), whereas this wind up device (22) pulls the belt (20) outside the vessel (1) while the belt (20) scratches the separation plate (15) and removes the heel (100).

12. Method according to claim 10, wherein both ends (201' 201") of the belt (20) are pulled manually by an operator.

13. Method according to claim 12, wherein the operator works through a human protection box (26) in order to protect from contact with toxic substances.

* * * * *